United States Patent [19]

Kishimoto et al.

[11] 3,886,207

[45] May 27, 1975

[54] PROCESS FOR PRODUCING INDAN-1-CARBOXYLIC ACID DERIVATIVES

[75] Inventors: Shoji Kishimoto, Osaka; Tetsuya Aono, Kyoto; Shunsaku Noguchi, Osaka, all of Japan

[73] Assignee: Takeda Chemical Industries, Ltd., Japan

[22] Filed: June 19, 1973

[21] Appl. No.: 371,527

[30] Foreign Application Priority Data
June 26, 1972 Japan.............................. 47-63902

[52] U.S. Cl.............................. 260/515 A; 424/317
[51] Int. Cl............................................. C07c 63/44
[58] Field of Search...................... 260/515 R, 515 A

[56] References Cited
UNITED STATES PATENTS
3,772,343  11/1973  Noguchi et al. ..................... 260/515

OTHER PUBLICATIONS

Gould, Mechanism and Structure in Org. Chem., (1959), pages 442–443.

Wagner et al., Syn. Org. Chem., (1953), pages 2–3.

Weygand et al., Preparative Org. Chem., (1972), pages 936–937.

*Primary Examiner*—James A. Patten
*Attorney, Agent, or Firm*—Wenderoth, Lind & Ponack

[57] ABSTRACT

5-Cycloalkyl-6-halogenoindan-1-carboxylic acid (cycloalkyl group herein is six- or five-membered one) is produced through halogenation of indan-1-carboxylic acid to introduce halogen at its 6-position selectively, and following alkylation to introduce cycloalkyl group at the 5-position. The latter reaction is effectively conducted by acting on 6-halogenoindan-1-carboxylic acid a cycloalkyhalide, a cycloalkanol, its sulfonates or a cycloalkene. The product may be converted into the form of its pharmaceutically acceptable salts. The products are useful as antipyretic, analgesic or antiinflammatory agent for human or animal use.

10 Claims, No Drawings

PROCESS FOR PRODUCING INDAN-1-CARBOXYLIC ACID DERIVATIVES

The present invention relates to a process for producing indan-1-carboxylic acid derivatives, more particularly relates to a novel and industrially feasible process for producing indan-1-carboxylic acid derivatives of the general formula (I) or pharmaceutically acceptable salts thereof, which are useful as medicines such as an antipyretic, analgesic or anti-inflammatory agent for human or animal use;

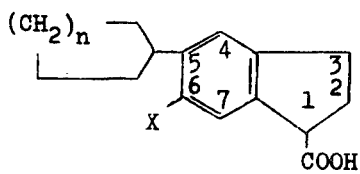
(I)

wherein X represents a halogoen atom, and n is 1 or 2.

The process of the present invention, by which the above object compounds (I) can be produced, comprises subjecting indan-1-carboxylic acid of the formula (II):

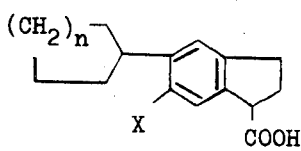
(II)

to halogenation to obtain a 6-halogenoidan-1-carboxylic acid of the general formula (III):

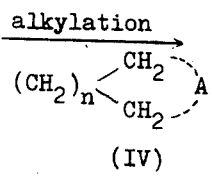
(III)

wherein X is as defined above, and, then, reacting the compound (III) with a compound of the general formula (IV);

(IV)

wherein n is as defined above, and A represents —CH=CH— or

-CH=CH- or $\underset{-CH_2-CH-}{\overset{Y}{|}}$ (Y represents a halogen atom, hydroxyl group or sulfonic acid residue of the formula —OSO₂—R, wherein R represents a lower alkyl group having up to 4 carbon atoms, phenyl or a phenyl substituted by a lower alkyl group).

The reactions involved in the present process are shown in the following schema;

Step (A)

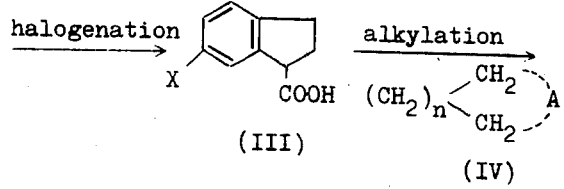

Step (B)

halogenation →  → alkylation → 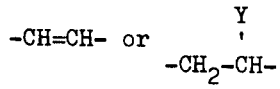
(III) (IV)

wherein X, A and n are as defined above.

Hitherto there have been reported a few methods for producing the compounds (I) [e.g. U.S. Pat. No. 3,565,943, Japanese Patent Application No. 70287/1971 (laid open to public inspection on May 11, 1972) and German patent application No. P 20 23000.6 (laid open to public inspection on Aug. 5, 1971)], wherein the compounds (I) are produced through several reaction steps starting from cycloalkylbenzene (e.g. cyclohexylbenzene).

However, the known methods for producing the compounds (I) are not very satisfactory from an industrial point of view such as yield of the compounds (I) and complicatedness of the processes.

Under these circumstances, the present inventors have made extensive studies for developing novel and advantageous routes for producing the compounds (I).

As the results of the studies, the present inventors have quite unexpectedly found out that by reacting the 6-halogenoindan-1-carboxylic acid (III) with the compound (IV), the alkyl group corresponding to the compound (IV) is introduced into the 5-position of the compound (III) with a remarkably high degree of selectivity to give the compound (I) in a high yield, and moreover there is involved substantially no dialkylation of the compound (III). The present invention has been accomplished on the basis of this finding.

Thus, according to the present process, the object compounds (I) can easily be produced in a high yield by simple processes, and therefore, the present process is remarkably feasible, effective and advantageous from an industrial point of view.

Namely, the principal and essential object of the present invention is to provide a novel and industrially feasible process for producing the compounds (I), and this object can be attained by the process described hereinafter.

In the above general formulas, the halogen atom represented by the symbols X and Y includes, for example, chlorine, bromine and iodine. Among these halogen atoms, chlorine and bromine are preferably from a practical point of view. The lower alkyl group represented by the symbol R includes, for example, methyl, ethyl, propyl and isopropyl, butyl, sec.-butyl and tert.-butyl group. The lower alkyl group, which is substituted on phenyl group represented by the symbol R, is the same as the lower alkyl one represented by the symbol R, and it may be substituted in any optional position of the phenyl group R. When A represents

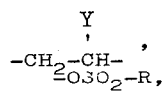

wherein Y is a sulfonic acid residue of the formula —OSO$_2$—R, namely, when the compound (IV) is a sulfonate of the cycloalkanol of the formula;

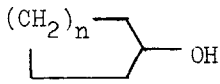

wherein $n$ is as defined above, among the sulfonates, methanesulfonates, ethanesulfonates, benzenesulfonates and p-toluenesulfonates of the cycloalkanols are preferable from a practical point of view.

In accordance with this invention, the reaction of Step (A) is carried out by subjecting the compound (II) to halogenation.

This halogenation can be conducted advantageously by allowing a molecular halogen to act upon the compound (II) in the presence of a Firedel-Crafts' type catalyst and a solvent. This catalyst is exemplified by metal halides such as aluminum chloride, antimony pentachloride, ferric chloride, titanium tetrachloride, tin tetrachloride, zinc chloride, cuprous chloride, etc.; iron powder; boron trifluoride; and so forth. Particularly desirable is ferric chloride. The amount of the said catalyst is about 0.5 to about 2 moles, preferably about 1 mole, per mole of the compound (II). While it depends upon the reaction conditions, the amount of the said molecular halogen which is generally advisable is about 1 to about 4 moles, preferably about 1 to about 2 moles, per mole of the compound (II). The solvent is exemplified by halogenated hydrocarbons such as dichloromethane, dichloroethane, carbon tetrachloride, chloroform, tetrachloroethane, etc.; nitromethane; acetonitrile; acetic acid; and so forth; acetonitrile being particularly desirable. The reaction temperature generally lies in the range of about 0° to about 60°C, and the range of about 0° to about 30°C is particularly desirable. In the process of this invention, by the above halogenation, a halogen atom is introduced into the 6-position of the starting compound (II) in a high degree of selectivity.

The reaction of Step (B) is conducted by reacting the compound (III) obtained in Step (A) with a cycloalkyl halide, cycloaklanol or its sulfonate of the general formula (IV) or a cycloalkene of the general formula (IV), which acts as an alkylating agent of the reaction of this Step. Generally, this alkylation is desirably conducted in the presence of a catalyst and a solvent. The catalyst is exemplified by Friedel-Crafts' type catalysts and inorganic acids. Preferred examples of the said Friedel-Crafts' type catalysts are metal halides such as aluminum chloride, antimony pentachloride, ferric chloride, titanium tetrachloride, etc., hydrogen fluoride, boron trifluoride and the like. Preferred examples of the said inorganic acids are sulfuric acid, polyphosphoric acid and the like. Preferred examples of the said solvents are dichloromethane, dichloroethane, tetrachloroethane, carbon disulfide, n-hexane and the like. It is also possible to employ a large amount of sulfuric acid, hydrogen fluoride, polyphosphoric acid or the like so that it may act both as a solvent and as a catalyst. Generally the reaction temperature lies in the range of about 0°C to about 40°C.

Referring to the catalyst, while metal halides such as aluminum chloride, antimony pentachloride and feric chloride are preferred when cycloalkyl halides are employed as the alkylating agent, metal halides as described above, sulfuric acid, hydrogen fluoride, polyphosphoric acid and boron trifluoride are preferred when cycloalkanols, sulfonates of cycloalkanol or cycloalkenes are employed as the alkylating agent. In the case where cycloalkyl halides or cycloalkenes are employed the recommended amount of the catalyst ranges from about 1 to about 3 moles per mole of compound (III), and ranges from about 2 to about 10 moles on the same basis in the case where cycloalkanols or their sulfonates are employed. When the compounds (IV) wherein A is

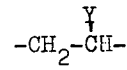

i.e. cycloalkyl halides, cycloalkanols or their sulfonates, are employed as alkylating agents of Step (B), their amount to be used ranges from about 1 to about 10 moles per mole of the compound (III), and when the compounds (IV) wherein A is —CH=CH—, i.e. cycloalkenes, are employed for the same purpose, its amount to be used ranges from about 1 to about 5 moles on the same basis. Among these cycloalkylating agents mentioned above, cycloalkanols are particularly preferred from a practical point of view.

As a result of the above alkylation, a cycloalkyl group is introduced into the 5-position of the compound (III) with a remarkably high degree of selectivity and, moreover, there is involved substantially no dicycloalkylation of the compound (III).

The object compound (I) thus formed can easily be isolated by conventional isolation and purification procedures such as extraction, recrystallization, distillation, chromatography, etc.

When the object compound (I) has been obtained in the free form, it may, as required, be converted to its salt by a conventional procedure. The salts of the compound (I) is exemplified by organic amine salts, inorganic salts, metal salts, etc., where the metal may for example be sodium, potassium, aluminum or calcium. The organic amine is exemplified by lower alkyl amines, which is substituted by a hydroxyl group, such as ethanolamine, diethanolamine, etc.; lower alkyl amines such as dimethylamine, diethylamine, etc.; cyclic amines such as piperazine, piperidine, etc.; and lower aralkyl amines such as phenethylamine, α-methylbenzylamine, etc. The inorganic salt may for example be the ammonium salt. On the contrary, when the object compound (I) has been obtained in the form of a salt, it may, as required, be converted to a free carboxylic acid by a conventional procedure.

The compounds of the general formula (I), which can be produced by the process of this invention, have antipyretic, analgesic and antiinflammatory activities, and thus, are useful as medicines such as antipyretic, analgesic and anti-inflammatory agents. When the object compound (I) is used as, for example, an antipyretic, analgesic or anti-inflammatory agent, it can be administered orally at the usual dosage of about 5 mg. to about 500 mg./day for adults in such dosage forms as tablets, capsules, powders, etc. or parenterally in amounts of about 5 to 200 mg. per dose in such forms as injections, suppositories, etc.

The starting compound (II) can be produced by the method described in Journal of Chemical Society, 3257 (1953).

For further explanation of the present invention, the following Examples are given, wherein the word "part(s)" is based on weight unless otherwise noted and the relationship between "part(s)" and "volume part(s)" corresponds to that between "gram(s)" and "milliliter(s)."

EXAMPLE 1

In 60 volume parts of acetonitrile is dissolved 4.9 parts of indan-1-carboxylic acid, and to the resulting solution a solution of 4.3 parts of chlorine in 50 volume parts of acetonitrile is added dropwise under cooling with ice-water and stirring. The stirring is continued for 3 hours under cooling with ice-water and, then, at 10° to 20°C for further 7 hours, followed by introduction of nitrogen gas for 30 minutes. Then, the acetonitrile is distilled off under reduced pressure, and the residue is dissolved in ethyl acetate. The solution is washed with an aqueous solution of sodium chloride, dried over sodium sulfate and concentrated under reduced pressure. The residue is recrystallized from 90 volume parts of n-hexane to give 6-chloroindan-1-carboxylic acid as colorless crystals melting at 116° to 121°C. Yield: 52 %. Further recrystallization from n-hexane gives crystals melting at 125° to 127°C.

Elementary analysis (for $C_{10}H_9O_2Cl$)

|  | C(%) | H(%) | Cl(%) |
|---|---|---|---|
| Calcd. | 61.05 | 4.61 | 18.03 |
| Found | 60.85 | 4.53 | 17.97 |

EXAMPLE 2

To 100 volume parts of acetonitrile 8.1 parts of ferric chloride and 8.1 parts of indan-1-carboxylic acid are added with stirring and under cooling with ice-water. Then, to the resulting mixture, a solution of 4.3 parts of chlorine in 86 volume parts of acetonitrile is added dropwise. The mixture is stirred under cooling with ice for 5 hours, and after which time a solution of 1.1 parts of chlorine in 21 volume parts of acetonitrile is further added. The whole mixture is stirred for 4 hours. Then, nitrogen gas is introduced to the resultant for 30 minutes, and after which time 100 volume parts of 7 % hydrochloric acid is added. The resulting mixture is concentrated under reduced pressure and keeping the temperature below 40°C. After removing most of the acetonitrile, dilute hydrochloric acid is added to the resultant, and the resulting mixture is extracted with ether. The extract is washed with water and dried over sodium sulfate. The ether is distilled off under reduced pressure, and the residue is recrystallized from 300 volume parts of n-hexane to give 6-chloroindan-1-carboxylic acid as colorless crystals melting at 118° to 123°C. Yield: 78 %. Further recrystallization from n-hexane yields crystals melting at 125° to 127°C.

Elementary analysis (for $C_{10}H_9O_2Cl$)

|  | C(%) | H(%) | Cl(%) |
|---|---|---|---|
| Calcd. | 61.08 | 4.61 | 18.03 |
| Found | 61.22 | 4.58 | 15.25 |

EXAMPLE 3

To 5 parts of ferric chloride is added 100 volume parts of carbon disulfide and, to the resulting mixture 2 parts of 6-chloroindan-1-carboxylic acid and 5 parts of cyclohexyl chloride are added under stirring and cooling with ice-water. The whole mixture is stirred at room temperature for 9 hours and, after the addition of 200 volume parts of 7 % hydrochloric acid, is extracted with ether. The etheric layer is washed with water and then extracted with a 2.5 % aqueous solution of sodium hydroxide. After washing with ether, the extract is acidified with dilute hydrochloric acid and, then, extracted with ethyl acetate. The extract is washed with water, dried over sodium sulfate and concentrated under reduced pressure. To the residue is added a small amount of n-hexane, and the resulting precipitates are collected by filtration to give 6-chloro-5-cyclohexylindan-1-carboxylic acid as pale yellowish crystals. Yield: 50 %. With the addition of a small amount of activated carbon, the crystals are recrystallized from n-hexane to give colorless crystals melting at 149 to 151°C.

Elementary analysis (for $C_{16}H_{19}O_2Cl$)

|  | C(%) | H(%) |
|---|---|---|
| Calcd. | 68.94 | 6.87 |
| Found | 68.77 | 6.81 |

EXAMPLE 4

To a mixture of 5 parts of 6-chloroindan-1-carboxylic acid and 4 parts of cyclohexene is added 30 volume parts of liquid hydrogen fluoride, and the whole mixture is stirred in a sealed vessel at a constant temperature of 20°C for 1 hour. After completion of the reaction, the hydrogen fluoride is evaporated under reduced pressure, and the residue is dissolved in ether. The ether solution is washed with water and then extracted with a 5 % aqueous solution of sodium hydroxide. The extract is washed with ether and then acidified with dilute hydrochloric acid. The resulting precipitate is extracted with ethyl acetate. The extract is washed with an aqueous solution of sodium chloride and dried over sodium sulfate and concentrated under reduced pressure. The residue is treated with a small amount of n-hexane and the resulting crystals are collected by filtration to give 6-chloro-5-cyclohexylindan-1-carboxylic acid as almost colorless crystals melting at 140° to 145°C. Yield: 57 %. Recrystallization from n-hexane yields colorless crystals melting at 149° to 151°C.

Elementary analysis (for $C_{16}H_{19}O_2Cl$)

|  | C(%) | H(%) |
|---|---|---|
| Calcd. | 68.94 | 6.87 |
| Found | 68.88 | 6.79 |

EXAMPLE 5

To 25 volume parts of sulfuric acid is added 5 parts of 6-chloroindan-1-carboxylic acid under stirring in an ice bath. After complete dissolving of the starting material, to the resulting solution is added dropwise 7.0 parts of cyclohexanol. After completion of the dropwise addition, the whole mixture is stirred under cooling with ice for 2 hours and, then, at room temperature for an additional 2 hours. The reaction mixture is poured into ice and extracted with ether. The etheric layer is further extracted with a 5 % aqueous solution of sodium hydroxide, and the extract is washed with ether and acidified with hydrochloric acid. The resulting precipitate is dissolved in ether. The ether solution is washed with an aqueous solution of sodium chloride, dried over sodium sulfate and concentrated under reduced pressure. The residue is crystallized from n-hexane to give 6-chloro-5-cyclohexylindan-1-carboxylic acid as colorless crystals melting at 147° to 150°C. Yield: 68 %. Recrystallization from n-hexane yields crystals melting at 149° to 151°C.

Elementary analysis (for $C_{16}H_{19}O_2Cl$)

|        | C(%)  | H(%) |
|--------|-------|------|
| Calcd. | 68.94 | 6.87 |
| Found  | 68.90 | 6.93 |

By employing cyclopentanol in place of cyclohexanol in the reaction of the above example, the similar result is obtained. Elementary analysis of 6-chloro-5-cyclopentylindan-1-carboxylic acid thus obtained (for $C_{15}H_{17}O_2Cl$)

|        | C(%)  | H(%) | Cl(%) |
|--------|-------|------|-------|
| Calcd. | 68.05 | 6.47 | 13.39 |
| Found  | 67.78 | 6.43 | 13.27 |

Melting point: 127 to 129°C.

EXAMPLE 6

To 90 volume parts of n-hexane are added 3.0 parts of 6-chloroindan-1-carboxylic acid and 9.0 parts of cyclohexanol and, then, to the resultant boron trifluoride is introduced under cooling with ice and stirring. After the boron trifluoride reaches a point of saturation, the whole mixture is stirred at room temperature for 5 hours. Then, the excess of boron trifluoride is removed, and the residual reaction mixture is poured into ice and extracted with ether. The etheric layer is further extracted with a 5 % aqueous solution of sodium hydroxide, and the extract is washed with ether and acidified with hydrochloric acid. The resulting mixture is extracted with ether, and the etheric extract is washed with an aqueous solution of sodium chloride and dried over sodium sulfate. Thereafter, the solvent is distilled off under reduced pressure. The residue is crystallized from n-hexane to give 6-chloro-5-cyclohexylindan-1-carboxylic acid as colorless crystals melting at 141° to 148°C. Yield: 50 % Recrystallization from n-hexane yields crystals melting at 148° to 150°C.

Elementary analysis (for $C_{16}H_{19}O_2Cl$)

|        | C(%)  | H(%) |
|--------|-------|------|
| Calcd. | 68.94 | 6.87 |
| Found  | 69.11 | 7.01 |

EXAMPLE 7

To 5.3 parts of aluminum chloride is added 50 volume parts of dichloromethane, and to the resultant is added 2 parts of 6-chloroindan-1-carboxylic acid under cooling with ice and stirring. Then, to the resulting mixture 6.3 parts of cyclohexyl p-toluenesulfonate is added in small portions. After completion of the addition, the whole mixture is stirred at room temperature for 5 hours. Then, to the reaction mixture 200 volume parts of 7 % hydrochloric acid is added, and the whole mixture is extracted with ether. The etheric layer is washed with water and extracted twice with 100 volume parts of a 5 % aqueous solution of sodium hydroxide. The extract is washed with ether and acidified with dilute hydrochloric acid. The resulting mixture is extracted with ethyl acetate, washed with water and dried over sodium sulfate. Thereafter, the solvent is distilled off under reduced pressure, and a small amount of n-hexane is added to the residue. The resulting precipitates are collected by filtration to give 6-chloro-5-cyclohexylindan-1-carboxylic acid as crystals melting at 142° to 149°C. Yield: 54 %. Recrystallization from n-hexane gives colorless crystals melting at 149° to 151°C.

Elementary analysis

|        | C(%)  | H(%) |
|--------|-------|------|
| Calcd. | 68.94 | 6.87 |
| Found  | 68.88 | 6.81 |

EXAMPLE 8

To a mixture of 4 parts of 6-chloroindan-1-carboxylic acid and 3 parts of cyclopentene is added 40 volume parts of hydrogen fluoride, and the whole mixture is stirred in a sealed vessel under cooling with ice for 2.5 hours. Thereafter, the hydrogen fluoride is evaporated under reduced pressure and, then, to the residue are added water and ether. The whole mixture is shaken well, and the etheric layer is washed with water and, then, extracted with a 5 % aqueous solution of sodium hydroxide. The extract is washed with ether and acidified with dilute hydrochloric acid. Then, the resulting mixture is extracted with ethyl acetate. After washing with an aqueous solution of sodium chloride, the extract is dried over sodium sulfate and concentrated under reduced pressure to give a crystalline residue. Recrystallization from 10 volume parts of n-hexane yields 6-chloro-5-cyclopentylindan-1-carboxylic acid as colorless crystals melting at 121° to 126°C. Yield: 55 %. Further recrystallization from n-hexane gives crystals melting at 129° to 131°C.

Elementary analysis (for $C_{15}H_{17}O_2Cl$)

|  | C(%) | H(%) |
|---|---|---|
| Calcd. | 68.05 | 6.47 |
| Found | 68.22 | 6.44 |

EXAMPLE 9

To 8.1 parts of ferric chloride is added 300 volume parts of carbon tetrachloride, and to the resultant is added dropwise a solution of 8.1 parts of indan-1-carboxylic acid in 100 volume parts of dichloromethane under stirring and cooling with ice-water. Then, to the resulting mixture is added dropwise a solution of 8.8 parts of bromine in 20 volume parts of carbon tetrachloride. Thereafter, the whole mixture is stirred under cooling with ice-water for 3.5 hours and at room temperature for an additional 1.5 hours. Then, to the reaction mixture is added 500 volume parts of 7 % hydrochloric acid, and the resulting mixture is extracted with 500 parts of chloroform. The chloroform layer is washed with water and dried over magnesium sulfate. Thereafter, the solvent is distilled off under reduced pressure to give a crystalline residue. Recrystallization from 250 volume parts of cyclohexane yields 6-bromoindan-1-carboxylic acid as colorless crystals melting at 139° to 141°C. Yield: 70 %. Further recrystallization from cyclohexane gives crystals melting at 142° to 144.5°C.

Elementary analysis (for $C_{10}H_{19}O_2Br$)

|  | C(%) | H(%) | Br(%) |
|---|---|---|---|
| Calcd. | 49.81 | 3.76 | 33.15 |
| Found | 49.71 | 3.66 | 33.38 |

EXAMPLE 10

To 25 volume parts of concentrated sulfuric acid is added 5 parts of 6-bromoindan-1-carboxylic acid under cooling with ice-water and stirring. Then, to the resultant is added 7 volume parts of cyclohexanol dropwise over 30 minutes at 20 to 25°C and the mixture is stirred at 25°C for 4 hours. The resulting reaction mixture is poured into a large amount of ice-water and extracted with ether. After washing with water, the etheric layer is extracted with a 5 % aqueous solution of sodium hydroxide. The extract is washed with ether and then acidified with dilute hydrochloric acid. The resulting precipitate is extracted with ethyl acetate. The extract is washed with an aqueous solution of sodium chloride, dried over sodium sulfate and concentrated under reduced pressure to give a residue. The residue is treated with 100 volume parts of n-hexane and the precipitate is collected to give 6-bromo-5-cyclohexylindan-1-carboxylic acid as colorless crystals melting at 158° to 162°C. Yield: 56 %. Recrystallization from n-hexane yields crystals melting at 161° to 164°C. Mixed melting point with an authentic sample shows no depression.

Elementary analysis (for $C_{16}H_{19}O_2Br$)

|  | C(%) | H(%) | Br(%) |
|---|---|---|---|
| Calcd. | 59.47 | 5.93 | 24.73 |
| Found | 59.53 | 5.85 | 24.55 |

EXAMPLE 11

To a mixture of 32.4 parts of indan-1-carboxylic acid and 32.4 parts of ferric chloride in 130 volume parts of acetonitrile is added a solution of 21.3 parts of chlorine in 190 volume parts of acetonitrile dropwise with stirring over 1 hour under cooling with ice-water. After completion of the addition, the stirring is continued for another 1.5 hours under cooling. The reaction mixture is poured into ice and the resulting precipitates are collected, washed with water and dried to give crude 6-chloroindan-1-carboxylic acid. The crude 6-chloroindan-1-carboxylic acid is dissolved in 170 volume parts of concentrated sulfuric acid under cooling with ice-water. To the solution is added 45 volume parts of cyclohexanol dropwise with stirring over 1.5 hours. After stirring at room temperature for another 2 hours, the reaction mixture is poured into ice and then extracted with benzene. The organic layer is washed with water and extracted with a 5 % aqueous solution of sodium hydroxide. The extract is washed with benzene and acidified with hydrochloric acid. The resulting solution is extracted with ethyl acetate. The ethyl acetate extract is washed with water, dried over sodium sulfate and concentrated under reduced pressure. The residue is treated with n-hexane to give 6-chloro-5-cyclohexylindan-1-carboxylic acid. Yield: 57 %.

Further recrystallization from n-hexane gives colorless crystals melting at 149° to 150°C. These crystals show no depression in melting point on admixture with an authentic sample prepared separately.

Elementary analysis (for $C_{16}H_{19}O_2Cl$)

|  | C(%) | H(%) |
|---|---|---|
| Calcd. | 68.94 | 6.87 |
| Found | 68.61 | 6.79 |

What we claim is:

1. A process for producing a compound of the general formula

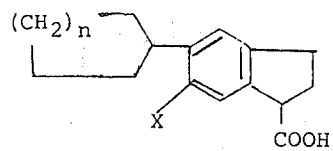

wherein X represents a halogen atom, and n is 1 or 2, or pharmaceutically acceptable salts thereof, which comprises reacting a compound of the general formula:

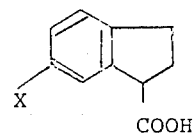

wherein X is as defined above, with a compound of the general formula:

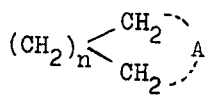

wherein n is as defined above, and A represents —CH=CH— or

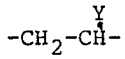

and wherein Y represents a halogen atom, hydroxyl group or sulfonic acid residue of the formula —OSO$_2$—R, wherein R represents a lower alkyl group having up to 4 carbon atoms, phenyl or a phenyl substituted by a lower alkyl group, in the presence of a Friedel-Crafts type catalyst or an inorganic acid.

2. A process claimed in claim 1, wherein A represents —CH=CH—.

3. A process claimed in claim 1, wherein A represents

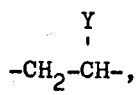

wherein Y is as defined in claim 1.

4. A process claimed in claim 1, wherein n is 1.
5. A process claimed in claim 1, wherein n is 2.
6. A process for producing a compound of the general formula;

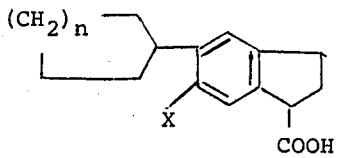

wherein X represents a halogen atom, and n is 1 or 2, or pharmaceutically acceptable salts thereof, which comprises subjecting indan-1-carboxylic acid of the formula;

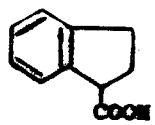

to halogenation by employing molecular halogen in the presence of a Friedel-Crafts type catalyst to obtain a compound of the general formula;

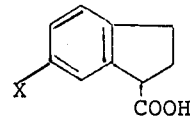

wherein X represents a halogen atom, and then reacting the latter compound with a compound of the general formula;

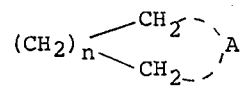

wherein n is as defined above, and A represents

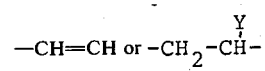

and wherein Y represents a halogen atom, hydroxyl group or sulfonic acid residue of the formula —OSO$_2$—R, wherein R represents a lower alkyl group having up to 4 carbon atoms, phenyl or a phenyl substituted by a lower alkyl group, in the presence of a Friedel-Crafts type catalyst or an inorganic acid.

7. A process claimed in claim 6, wherein A represents —CH=CH—.

8. A process claimed in claim 6, wherein A represents

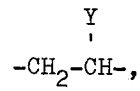

wherein Y is as defined in claim 6.

9. A process claimed in claim 6, wherein n is 1.
10. A process claimed in claim 6, wherein n is 2.

* * * * *